United States Patent
Daly et al.

(10) Patent No.: US 6,690,422 B1
(45) Date of Patent: Feb. 10, 2004

(54) METHOD AND SYSTEM FOR FIELD SEQUENTIAL COLOR IMAGE CAPTURE USING COLOR FILTER ARRAY

(75) Inventors: Scott J. Daly, Kalama, WA (US); Xiaofan Feng, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/433,540

(22) Filed: Nov. 3, 1999

(51) Int. Cl.$^7$ .......................... H04N 3/14; H04N 5/335; H04N 9/04; H04N 9/083
(52) U.S. Cl. ................. 348/273; 348/272; 348/268
(58) Field of Search .................. 348/268, 269, 348/270, 271, 272, 273, 277, 280, 317, 612, 620, 218.1, 490, 608, 70, 234, 106; 358/500, 503, 505, 513, 515, 512; 382/260

(56) References Cited

U.S. PATENT DOCUMENTS 2,738,377 A    3/1956  Weighton (List continued on next page.)

OTHER PUBLICATIONS

A.B. Watson, *Perceptual–components architecture for digital video*, JOSA A V.7, #10, pp 1943–1954, 1990.

K.T. Mullen, *The contrast sensitivity of human colour vision to red–green and blue–yellow chromatic gratings*, J. Physiol V.359, pp 381–400 1985.

L. Arend et al., *color breakup in sequentially scanned LCDs*, SID 94 Digest, pp 201–204 1994.

D. Post et al., *Predicting color breakup on field sequentially displays*, SPIE Proc. V. 3058, pp 57–65 1997.

Hunt, *The reproduction of colour in photography, printing and television*, 4th Ed., pp 409–410 Fountain Press, England 1987.

T. Tanaka et al., *HDTV Single–Chip CCD Color Camera*, IEEE Trans. On Consumer Electronics. V. CE–36, pp. 479–485, 1990.

H. Nabeyama et al., *All–solid–State Color Camera with Single Chip MOS Imager* IEEE Trans. On Consumer Electronics. V. CE–27, pp. 40–45, 1981.

*Primary Examiner*—Wendy R. Garber
*Assistant Examiner*—Justin Misleh
(74) *Attorney, Agent, or Firm*—Robert D. Varitz, P.C.

(57) ABSTRACT

A method of field sequential color image capture includes: optically capturing a scene frame-by-frame; filtering the scene through an active color shutter to produce a first color component set having plural first color components therein; detecting the scene with a color filter array area sensor, wherein each first color component of the first color component set of the scene is detected at different points in time within a frame; dividing the detected scene into a second color component set having plural second color components therein; aligning the second color component set in time for each frame interval; and combining the stored second color components into a frame image. A system for capturing a field sequential color image includes an optical capture mechanism for capturing a scene frame-by-frame in frame intervals which operates at a predetermined shutter speed; a color shutter for producing a first color component set having plural first color components therein, thereby modifying the spectral transmission of the scene as a function of time; a CFA area sensor for sensing the first color components, wherein each first color component of the scene is detected at a different point in time within a frame; an array field selector for dividing the scene into a second color component set having plural second color components therein; and a field-to-frame combiner for combining the second color components into a frame image.

33 Claims, 6 Drawing Sheets

U.S. PATENT DOCUMENTS

| | | | |
|---|---|---|---|
| 3,604,839 A | | 9/1971 | Kitsopoulos |
| 3,969,763 A | | 7/1976 | Tan |
| 3,971,065 A | | 7/1976 | Bayer |
| 4,067,043 A | | 1/1978 | Perry |
| 4,404,585 A | * | 9/1983 | Hjortzberg .................. 348/271 |
| 4,415,923 A | * | 11/1983 | Noda ......................... 348/675 |
| 4,605,956 A | | 8/1986 | Cok |
| 4,670,777 A | | 6/1987 | Ishikawa et al. |
| 4,745,458 A | * | 5/1988 | Hirano et al. ............ 348/436.1 |
| 4,786,964 A | * | 11/1988 | Plummer et al. ........... 348/270 |
| 4,851,899 A | | 7/1989 | Yoshida et al. |
| 4,967,264 A | | 10/1990 | Parulski et al. |
| 5,084,761 A | | 1/1992 | Nitta |
| 5,442,394 A | * | 8/1995 | Lee ............................. 348/264 |
| 5,512,956 A | * | 4/1996 | Yan ............................. 348/606 |
| 5,548,333 A | | 8/1996 | Shibazaki et al. |
| 5,631,703 A | | 5/1997 | Hamilton et al. |
| 5,748,236 A | | 5/1998 | Shibazaki |
| 5,751,384 A | | 5/1998 | Sharp |
| 5,754,229 A | * | 5/1998 | Elabd ......................... 348/319 |
| 5,767,899 A | | 6/1998 | Hieda et al. |
| 5,798,948 A | * | 8/1998 | Rashkovskiy et al. ...... 348/620 |
| 6,005,616 A | * | 12/1999 | Itoh et al. ................... 348/269 |
| 6,208,393 B1 | * | 3/2001 | Bawolek et al. ............. 349/106 |
| 6,504,573 B2 | * | 1/2003 | Kubota et al. .............. 348/270 |

\* cited by examiner

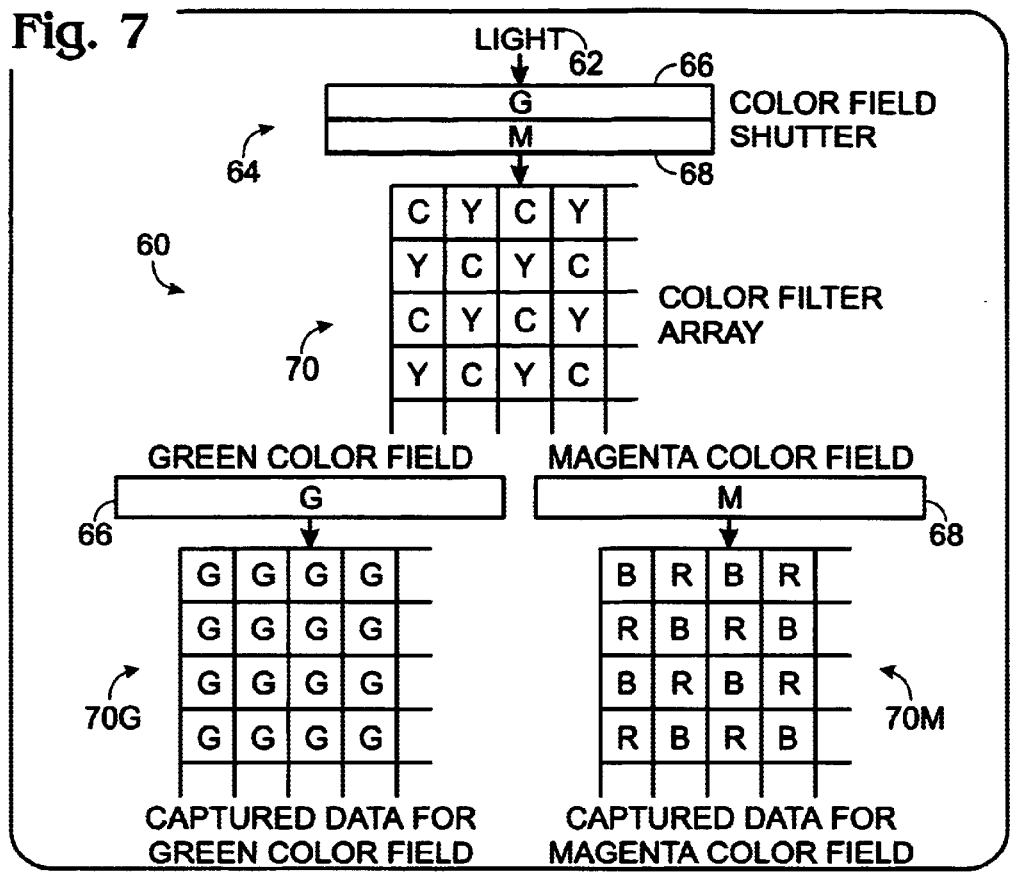
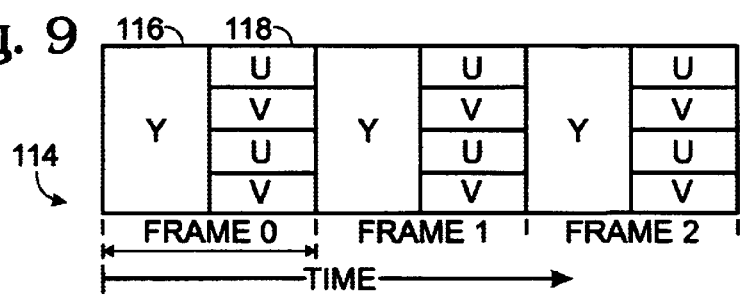
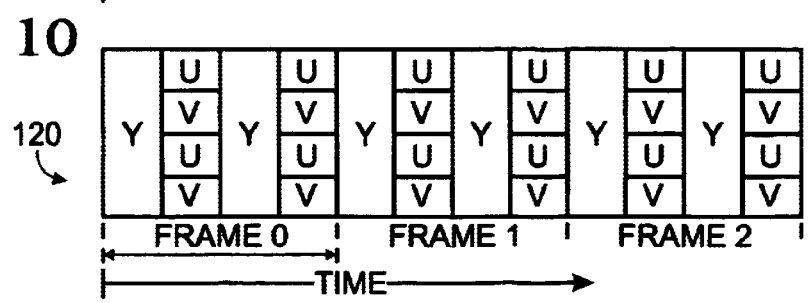

METHOD AND SYSTEM FOR FIELD SEQUENTIAL COLOR IMAGE CAPTURE USING COLOR FILTER ARRAY

FIELD OF THE INVENTION

This disclosure relates to the capture of color motion imagery, and specifically to the capture of color motion imagery by sequential frame samples of different color filtration, combined with a sensor having a color filter array overlaid on its imaging pixels.

BACKGROUND OF THE INVENTION

There are three basic approaches to capturing color motion imagery. The first uses three sensors, typically using red, green and blue filters, which simultaneously capture a scene's dynamic content. This technique is used with both tube pickup devices and with two dimensional sensor arrays, such as charge coupled devices (CCD) or composite metal-on-silicon (CMOS) devices, which are referred to as 3-CCD cameras.

The second approach uses a single two dimensional (2D) sensor having the color filtration applied separately to each pixel. Colors are arranged in spatially varying patterns that are designed to provide a high spatial bandwidth for luminance or green, and to minimize color aliasing artifacts. The result is that each color layer has incomplete samples per frame but special interpolation algorithms are used to reconstruct full dimensioned frames for each color layer. This approach is known as color filter array (CFA) camera capture.

The third approach is to use a single sensor with either no filtration, or uniform filtration across picture elements, and to combine this with a method to change the filtration over the whole sensor as a function of time. The idea is to temporally change the sensor filtration at rates faster than the temporal response of the eye, so that the sequential color lag, aka color breakup, is below visual threshold. It is most commonly referred to as field sequential color capture (FSC).

The primary disadvantage of the 3-CCD, or 3-tube, approach is the cost of three sensors. A second disadvantage is the problem of color mis-registration between the three sensors because of alignment in the optical path relative to the scene, which may impose tight manufacturing tolerances that increase manufacturing costs. Color mis-registration may cause luminance blur in textures with very small amounts of mis-registration, and may cause color bleeding, aka color fringing, at both achromatic and chromatic edges. If the registration is well aligned, this approach achieves the resolution of the sensors for all three color layers of a frame. Because of cost, however, this approach is only used for high-end studio video cameras, and digital still cameras designed for the professional and advanced hobbyist.

While the CFA approach is less expensive because of the use of a single sensor, it has many disadvantages. These include reduced spatial resolution, the necessity for an interpolation algorithm to reconstruct the three color frames for display, and the necessity for an anti-aliasing filter to prevent diagonal luminance high spatial frequencies from aliasing into lower frequency color patterns. Additionally, the color high spatial frequencies may alias into luminance or color patterns. Consequently, there is a trade-off between sharpness and color artifacts, which show up strongly in such common image content as highlight reflections in eyes, as well as the expected luminance high spatial frequencies such as in texture, e.g., hair, or geometric patterns. In current implementations, fairly complex interpolation algorithms that include pattern recognition are used in an attempt to maximize sharpness and minimize color spatial artifacts. Most cameras opt to avoid any chromatic aliasing because it is a new categorical distortion and favor the sharpness reduction, which is already present to some extent. In summary, CFA systems do not achieve the resolution of their sensor dimensions, either in luminance or in color.

The field sequential color technology is not presently a very active area, and much of the key work was done prior to the NTSC color standard, when field sequential color was a viable competitor for color television. Analog field sequential color video was difficult to accomplish at high frame rates. Its primary application was in telecine and other specialized applications. Recently, FSC activity increased because of full digitization of video systems. Digital video facilitates field sequential color capture to simultaneous color displays.

U.S. Pat. No. 2,738,377, to Weighton, granted Mar. 13, 1956 for Color Television, describes a color television system which uses a rotating color filter wheel, with equally spaced wedges in the order GRGBGRGB, with a single pickup tube, and a CRT to constitute a full color television system. The reference describes an eight-fold interlace, with the color wheel spinning fast enough to cause a different color filter for each interlace line. A sufficient number of lines are used to result in a captured image with 400 G lines and 200 R and B lines. The main difficulty with this approach is the extreme demand imposed on the system bandwidth due to the eightfold interlace. Another is that color field sequential display is required in this system, and because of eye movements, such displays are more susceptible to color breakup than color field sequential capture.

U.S. Pat. No. 3,604,839 to Kitsopoulos, granted Sep. 14, 1971 for Field-sequential color television apparatus employing color filter wheel and two camera tubes, describes a television system having a color filter wheel and two camera tubes, which is primarily aimed at telecine. The purpose of the two tubes is to allow for simultaneous capture of two different colors, thus allowing the exposure to lengthen, given the field rate constraints, and increase the signal to noise ratio.

U.S. Pat. No. 3,969,763 to Tan, granted Jul. 13, 1976, for Color television camera provided with a pickup device and color filter placed in front thereof, describes a color field sequential camera that uses a single pickup tube and a color filter wheel with many fine color strips. The purpose is to capture the color filtered sections of an image more spatially and temporally coincident. It approaches a color sequential interlace, and is primarily an analog hardware system addressing various delay and converter steps. The reference is notable because it discloses a system which uses liquid filters that are electronically controllable, rather than using a mechanical wheel. The system also captures in a YRB space, rather than the more common RGB.

U.S. Pat. No. 3,971,065 to Bayer, granted Jul. 20, 1976, for Color Imaging Array, describes the Bayer pattern color filter array.

U.S. Pat. No. 4,067,043, to Perry, granted Jan. 3, 1978 for Optical conversion method, describes the use of electro-optically controlling color filtration, in a field sequential mode, via the use of crossed polarizers.

U.S. Pat. No. 4,605,956 to Cok, granted Aug. 12, 1986, for Single-Chip Electronic Color Camera with Color-Dependent Birefringent Optical Spatial Filter and Red/Blue Signal Interpolating Circuit, describes an RGB CFA system, including birefringent optical prefilter and the interpolation algorithms for the subsampled R and B image layers.

U.S. Pat. No. 4,670,777 to Ishikawa et al., granted Jun. 2, 1987, for Colorfilter array having cyan, yellow, green, and magenta filter elements providing increased dynamic range for use with field integrating mode solid state imaging device, describes the use of subtractive color filters as well as an additive. The field integration refers to interlace fields, not color shutter fields.

U.S. Pat. No. 4,851,899 to Yoshida et al., granted Jul. 25, 1989, for Field-sequential color television camera, describes an RGB field sequential camera using a color wheel that causes the field order to be R1R2G1G2B1B2, etc. Because the first field of each color pair has a residual charge from the previous, different color, the system discards the first captured field in order to prevent color desaturation.

U.S. Pat. No. 4,967,264 to Parulski et al., granted Oct. 30, 1990, for Color sequential optical offset image sampling system, combines color field sequential concepts with sensor dithering to increase resolution. A color filter wheel is used containing, in order, 2 green, one red, and one blue element. The two green elements are placed at various tilts to create spatial offsets on the sensor, so the two green fields may be combined to create an image with higher green resolution than would be available solely from the sensor.

U.S. Pat. No. 5,084,761 to Nitta, granted Jan. 28, 1992, for Video camera with rotatable colorfilter and registration correction, addresses the color mis-registration caused by the variations in tilt and thickness of the color filter wheel in color field sequential cameras. The horizontal and vertical deflection signals are adjusted. Even though the color field sequential camera is, by design, not supposed to have a color registration problem, it does in fact have this problem because of the mechanics of the color wheel. The reference seeks to avoid this problem with electronically controlled color filters, such as a LCD.

U.S. Pat. No. 5,548,333 to Shibazaki et al., granted Aug. 20, 1996, for Color mixing prevention and color balance setting device and method for afield-sequential color television camera, addresses color mixing and color balance processes in a RGB filter wheel field sequential color camera. It allows a video field with a mixed color input, that is a transition from one color sector to another of the color wheel, to be used, but discards the signal during the mixed color time interval.

U.S. Pat. No. 5,631,703 to Hamilton et al., granted May 20, 1997, for Particular pattern of pixels for a color filter array which is used to derive luminance and chrominance values, describes a particular array using YMC and G.

U.S. Pat. No. 5,748,236, to Shibazaki, granted May 5, 1998, for Color mixing prevention and color balance setting device and method for afield-sequential color television camera, is based on a continuation-in-part application from the '333 patent, supra, however, this reference concentrates on the hardware, and specifically, the concept of discarding the accumulated charge during the mixed interval.

U.S. Pat. No. 5,751,384 to Sharp, granted May 12, 1998, for Colorpolarizers for polarizing an additive color spectrum along a first axis and its compliment along a second axis, describes switchable color filter via polarization and LCD as would be used in digital still and video cameras.

U.S. Pat. No. 5,767,899 to Hieda et al., granted Jun. 16, 1998, for Image pickup device, addresses the problem of constant luminance, where the luminance signal is formed prior to any gamma correction. This is opposed to conventional video processing, where the gamma correction non-linearity is applied to the RGB values prior to the formation of the luminance signal. In this device the captured Y, Cr, and Cb outputs from a CFA interpolation process are converted to RGB, gamma corrected, then converted to conventional YR-YB-Y. Various base-clipping, or coring, limiting, and color suppression based on the luminance signal are then incorporated.

A number of literature references in the field of human visual system modelling are relevant to invention. There are three basic visual properties relating the luminance channel, as represented by video Y, and the opponent color channels, as approximated by the color difference signals U and V. These are:

1. The maximum temporal frequency response of the opponent color system is less than ½ that of the luminance.
2. The maximum spatial frequency response of the opponent color system is near ½ that of the luminance.
3. The maximum sensitivity of opponent color system is slightly greater than ½ that of the luminance.

Properties #1 and #2 are best summarized in A. B. Watson *Perceptual components architecture*, JOSAA V. 7#10, 1990, pp1943–1954; while property #3 is described in K. T. Mullen *The contrast sensitivity of human colour vision to red-green and blue-yellow chromatic gratings* J. Physiol. V. 359, 1985, pp. 381–400. These three properties may be used in the design of the relative durations of exposures in order to prevent color lag and in the spatio-temporal integration following image capture.

There have also been recent vision science studies, namely L. Arend et al., *Color breakup in sequentially scanned LCDs*. SID 94 Digest, 1994, pp 201–204, and D. Post et al., *Predicting color breakup onfield-sequential displays*, SPIE Proc. V. 3058, 1997, pp 57–65, that specifically investigated color break-up, or color lag. Although these studies were performed for the application of field sequential color displays, some of their findings are relevant to color field sequential capture. One of these findings is that color lag detection has a strong luminance component. In fact, as the color offset between R, G and B layers is increased from zero to detectability, the first signal to exceed threshold is the luminance. This manifests itself as blurring in texture before any high contrast edge blur occurs, because of the masking effects caused by high contrast edges. Eventually, as the offset is increased, color artifacts become visible at high contrast edges.

Based on these findings, isolating the offsets of the luminance from the chrominance layers of an image is beneficial, as is maximizing the spatial capture of G, or luminance, Y, over that of R and B, or R-Y and B-Y. The work done with YRB camera systems, and documented in Hunt, *The reproduction of colour in photography, printing, and television*, 4th edition, 1987, pp 409–410, Fountain Press, England, is instructive. This work was investigated for three-sensor systems in the days when the sensors where tubes. The RYB system was developed in an attempt to reduce the visibility of the color offset problem due to manufacturing tolerances of optically aligning the tubes. Due to complications with gamma correction, it was abandoned in favor of RGBY systems, using four tubes.

Other works by H. Nabeyama et al, *All-solid-State Color Camera with Single Chip MOS Imager* IEEE Trans. On Consumer Electronics. V. CE-27, 1981, pp. 40–45; and T. Tanaka et al., IEEE Trans. On Consumer Electronics. V. CE-36, 1990, pp. 479–485, which describes the famous Y-C-G-M CFA, are relevant to the invention described herein.

SUMMARY OF THE INVENTION

A method of field sequential color image capture includes: optically capturing a scene frame-by-frame; filtering the scene through an active color shutter to produce a first color component set having plural first color components therein, thereby modifying the spectral transmission of the scene as a function of time; detecting the scene with a color filter array area sensor, wherein each first color component of the first color component set of the scene is detected at different points in time within a frame; dividing the detected into a second color component set having plural second color components therein; aligning the second color component set in time for each frame interval; storing each second color component in a memory unit; combining the stored second color components into a frame image; and processing the frame image for color reproduction and format.

A system for capturing a field sequential color image, includes an optical capture mechanism for capturing a scene frame-by-frame in frame intervals which operates at a predetermined shutter speed; a first color shutter for producing a first color component set having plural first color components therein, thereby modifying the spectral transmission of the scene as a function of time; a color filter array area sensor for sensing and modifying the first color components, wherein each first color component of the scene is detected at a different point in time within a frame; an array field selector for dividing the scene into a second color component set having plural second color components therein; a frame clock operating at a first predetermined rate, a color field control clock, operating at a second predetermined rate under control of the frame clock, for controlling the active color shutter and the area sensor at a second predetermined rate, multiple memory locations for storing each color component; and a field-to-frame combiner for combining the stored second color components into a frame image.

An object of the invention is to provide a system and method of color image capture using a CFA-FSC hybrid.

An object of the invention is to provide a system and method of increasing the temporal bandwidth of R and B color components by sacrificing some of the spatial bandwidth of the R and B layers, and to accomplish same without reducing the spatial or temporal bandwidth of the G, or luminance layer.

These and other objects and advantages of the invention will become more fully apparent as the description which follows is read in conjunction with the drawings.

BRIEF DESCRIPTION OF THE DRAWINGS

FIG. 7 is a schematic representation of a CFA and resulting spatio-chromatic samples for two different color shutter fields of the invention.

FIG. 9 depicts color field timing as used in the invention.

FIG. 10 depicts alternate color field timing as used in a modified form of the invention.

DETAILED DESCRIPTION OF THE PREFERRED EMBODIMENT

The invention has the advantage of using a single sensor chip, as in color filter array (CFA) and field sequential capture (FSC), but reduces the disadvantages of the CFA interpolation artifacts, and FSC color breakup artifacts. It accomplished this because the CFA approach exploits the spatial bandwidth reductions, while ignoring the temporal, and vice-versa for the FSC approach. The combination of the two techniques allows the system to utilize both bandwidth reductions of the human visual system, thus allocating more quality to where it is most perceptible.

Figure 1:
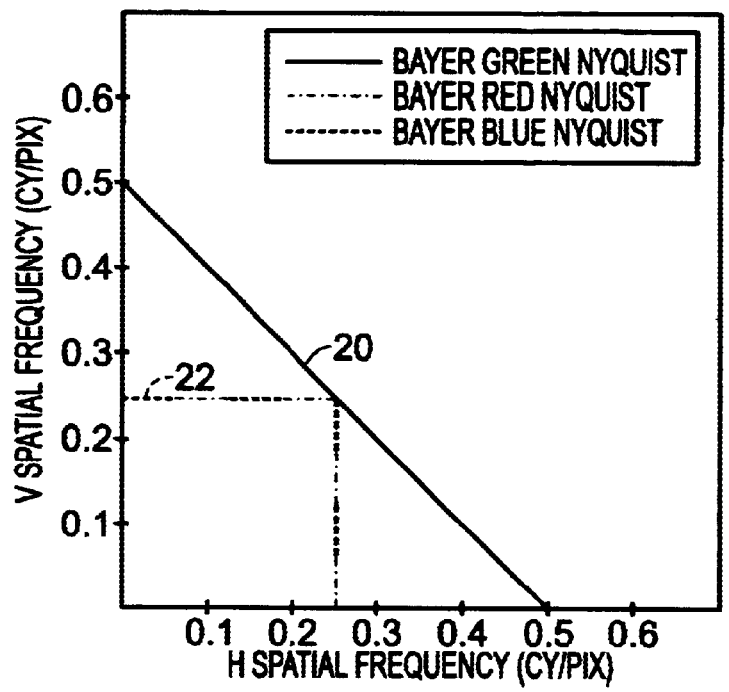
FIG. 1 depicts the frequency capability of a CFA sensor.

These concepts are illustrated in FIGS. 1–6. FIG. 1 depicts the Nyquist folding frequencies for the typical two-dimensional (2D) CFA (Bayer) pattern, generally at 20, which is referred to herein as the Nyquist boundary. The line with a slope of −1 is the boundary for the green image, which achieves the value of 0.5 cy/pix only at the horizontal and vertical frequencies. The red and blue image Nyquist values are shown, overlaid one another, by line 22, and are restricted to the square region limited by 0.25 cy/pixel. Generally, these color signals are used so that green (G) captures luminance, and red (R) and blue (B) capture chrominance difference signals by taking their difference, or ratio, with G. This means that luminance information with higher frequencies than those indicated by the triangle under Nyquist boundary 20 will alias into lower frequencies, showing up as both luminance and chrominance alias patterns. Similar effects occur for chrominance information outside of the smaller Nyquist square boundary, line 22. Because it is most critical to get minimally aliased luminance information in an image, only the luminance Nyquist boundaries in the following figures is considered.

Figure 2:
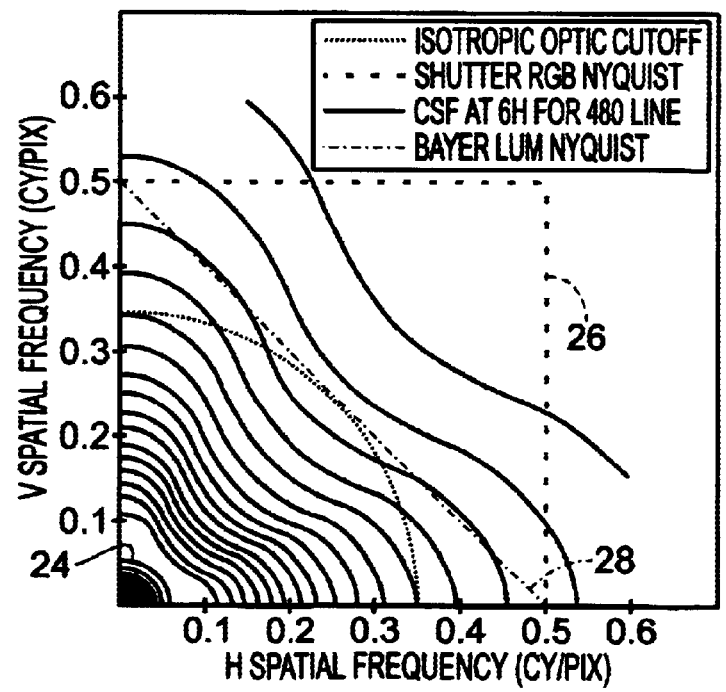
FIG. 2 depicts the frequency capability of CFA and full frame sensors, isotropic optics, and the human visual system.

In FIG. 2 includes several additional elements. Contours, such as those indicated at 24, depict the human visual system's contrast sensitivity function (CSF), which is analogous to its frequency response. This CSF is mapped to the digital frequency plane based on calibration via the size of the image in pixel heights, and the viewing distance as expressed in units of picture heights. This mapping is a way of normalizing the actual physical display size and viewing distance. In FIG. 2, the displayed image size is 480 pixels high and the viewing distance is 6-picture heights (6H), which is the traditional standard used for National Television Systems Committee (NTSC). The CSF is a 2D surface, whose values are shown as a contour plot, with a peak frequency response near 0.08 cy/pix for this viewing distance. The highest frequency contour corresponds to the highest frequency the eye may see.

The Nyquist boundary for a full-frame image capture system is depicted in FIG. 2 as a rectangular region 26. This boundary is applicable for both 3-CCD systems or field sequential color capture systems. Rectangular region 26 is bounded by 0.5 cy/pix in both the horizontal and vertical directions, and is referred to herein as shutter RGB. A CFA luminance channel, line 28, is also depicted. The area in between the triangle formed by line 28 and rectangle 26 is the resolution advantage of the full-frame over the CFA approaches, which is a doubling of the area of the CFA boundary. However, this increased resolution is mitigated by the human visual system frequency response, whose anisotropy causes its isocontours to more closely follow the CFA pattern.

The final addition to FIG. 2 is curved line 30, which is the isotropic optic cutoff and is the result of an optical antialiasing filter that is used to prevent frequencies higher than the CFA Nyquist limit from reaching the sensor. Assume that the system's focusing lens, which is generally isotropic, is used for invoking this function. It is generally isotropic, and its radius, as shown in FIG. 2, is chosen to prevent aliasing at 45 degrees. Its bandwidth is selected as shown by circular line 30. Note that some high vertical and horizontal frequencies are lost in the CFA luminance channel, line 28, that are actually lower than Nyquist limits imposed by the CFA.

Figure 3:
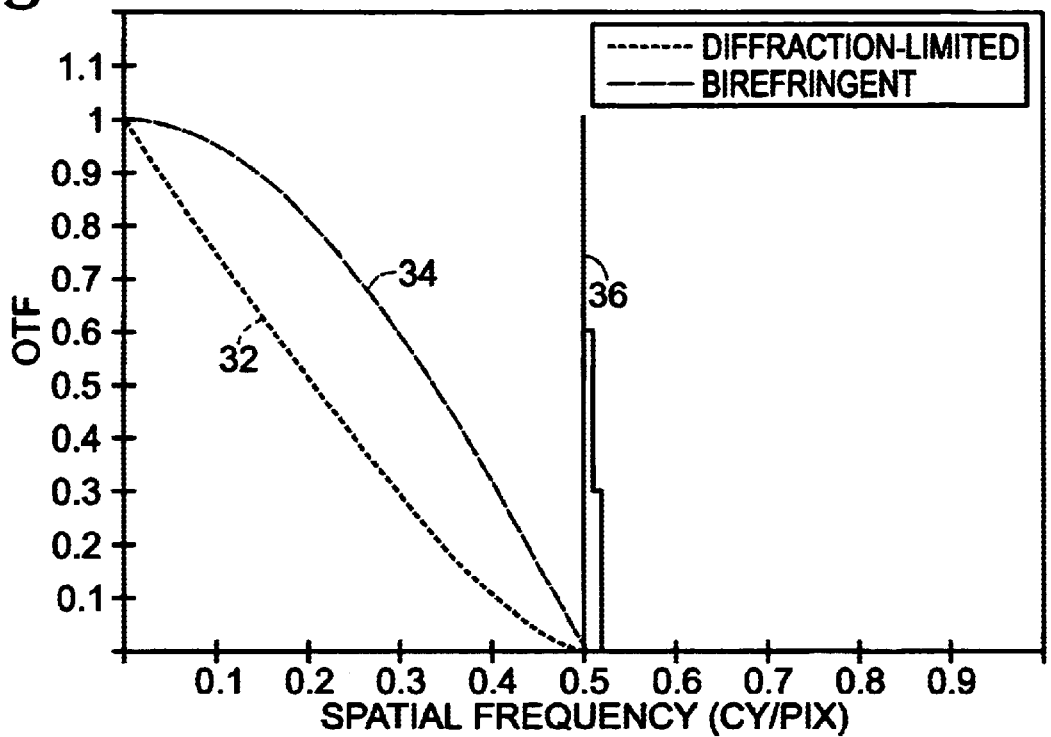
FIG. 3 depicts the frequency response of diffraction-limited optics and a birefringent crystal.

The use the lens optics for antialiasing is not generally done. A birefringent crystal filter is used because it has a better frequency response for a given cut-off frequency, as shown in FIG. 3. In FIG. 3, the frequency response of an optical lens can, at best, be diffraction limited, which response is shown as lower curve 32, where it is designed to cut-off at the Nyquist of 0.5 cy/pix. The birefringent filter merely causes a displacement in the beam, resulting in two impulse responses in the spatial domain, which may be modeled as a cosine in the frequency domain. This response is shown in the figure as upper curve 34, and is designed for the same cutoff frequency of 0.5 cy/pix. Line 36 represents the Nyquist folding frequency, past which aliasing occurs.

Figure 4:
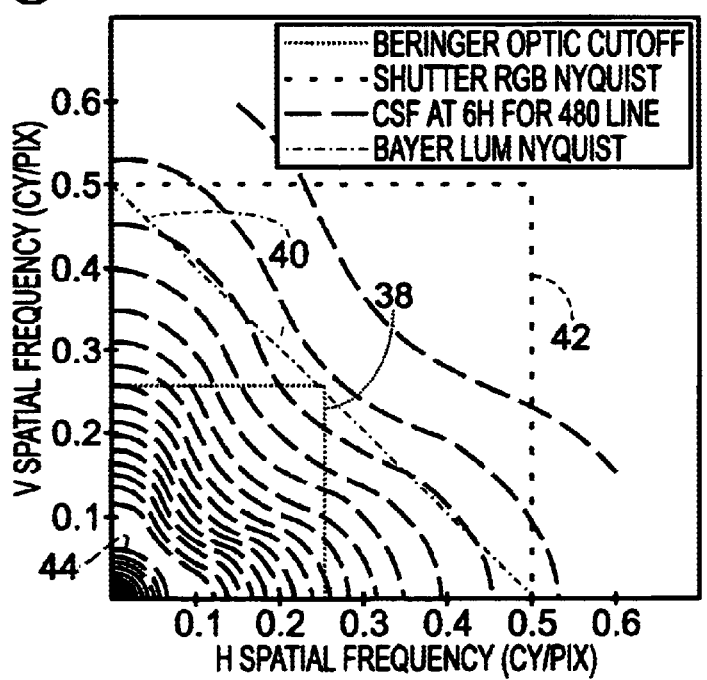
FIG. 4 depicts the frequency capabilities of CFA and full frame sensors, 2D birefringent optics and the human visual system.

Although the birefringent crystal filter has better frequency response characteristics for a given cut-off frequency, the general usage is to have one crystal displace a pixel horizontally, and to then cascade another crystal which causes a vertical displacement. The net effect is a Cartesian-separable low-pass filter (LPF) that is indicated in FIG. 4, where the cut-off frequencies are selected to avoid any luminance aliasing at the critical point at 45 degrees. Consequently, the horizontal and vertical Nyquist boundaries 38 end up at only 0.25 cy/pix, which strongly reduce the resolution potential of the sensor, thus reducing sharpness. Because various design are used to trade-off aliasing vs. sharpness, the typical CFA camera system frequency response will lie between rectangle 38 and Bayer-Luminance-Nyquist (B-L-N) triangular region 40. Regardless, one may see the substantial increase in resolution area afforded by a full sensor frame capture system, shown by shutter RGB rectangle 42 intersecting at 0.5 cy/pix in H and V. The isocontours of the CSF are shown at 44 at 6H for 480 lines of resolution.

The field sequential color approach has sampling problems in the temporal domain, but attempts to achieve the primary advantages of the 3-CCD approach and the CFA approach, while removing some of their disadvantages. It theoretically may achieve the full frame resolution of the 3-CCD approach for all color layers of a frame. Because there is only one sensor, the color mis-registration problem due to mechanical alignment is removed, leaving only the color mis-registration due to the optics, generally corrected by achromatizing lenses. It also accomplishes this with one monochrome sensor, exceeding the cost advantages of the CFA approach. Further it does not require the use of interpolation algorithms.

The FSC approach has its own particular problems, however. The most significant is that because the color fields are captured at separate points in time, the colors of a moving edge do not spatially align when the color fields are combined into a single full-color frame. The moving edge may be due to either object motion or camera motion. This effect is known as color breakup, aka color lag. This may be analyzed as a localized or motion-dependent color mis-registration, causing both luminance blur and color bleeding of moving edges. In some cases, such as still scenes, this color mis-registration is much less than the color mis-registration of the 3-CCD system, but in other cases, such as with fast motion, the color mis-registration may be worse than with the typical 3-CCD approach.

The other problem is in achieving three separate color captures in the duration of a single video frame, which is on the order of 17–33 ms. Until recently, this was accomplished by a rotating color filter wheel, which required mechanical engineering too expensive to utilize in lowcost cameras. Further, the presence of a component rotating at such a high velocity required frequent repair and re-calibration.

The temporal bandwidth of the human visual system is highest for luminance signals, which are primarily captured with green filters. The temporal bandwidth for the iso-luminantchromatic content of the red and blue signals, which also may contain some luminance content, is roughly ½ that of the luminance. A scheme that benefits from these properties of the HVS captures the color fields in the an RGBG . . . order. This reduces the achromatic component of the break-up effect, to last for, at most, two field durations, as opposed to the three field duration of traditional RGBRGB approach. The achromatic lag causes what is known as a jutter effect, where moving edges appear to pulsate in the direction of their motion. Although this approach reduces the G jutter to two fields, the R and B jutter is increased to four fields. However, increasing the overall field rate may compensate for this condition.

Figures 5, 6:
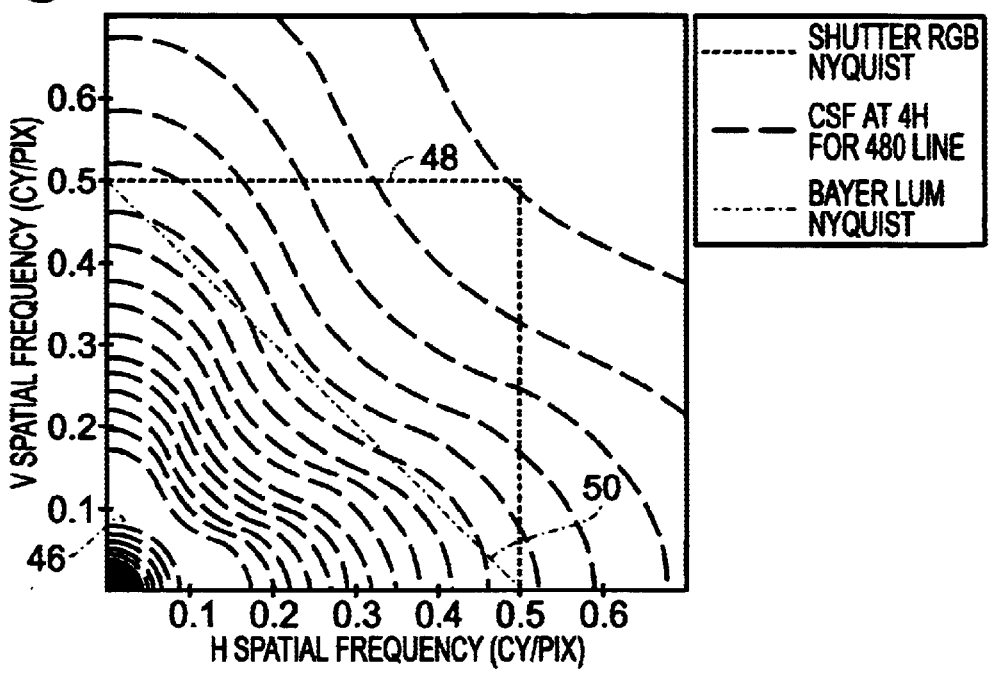
FIG. 5 depicts the frequency capabilities of CFA and full frame sensors, 2D birefringent optics and the human visual system of FIG. 4 at 4H VD at standard resolution.
FIG. 6 depicts the frequency capabilities of CFA and full frame sensors, 2D birefringent optics and the human visual system of FIG. 4 at 4H VD at high resolution.

The various spatial frequency responses of these three systems are shown in FIGS. 5 and 6, and are plotted against the HVS 2D CSF for additional viewing distances and for additional displayed image resolutions. The first (FIG. 5) is shown for the standard definition (SD) resolution of 480 lines, but with a more demanding viewing distance of four picture heights. CSF is depicted at 46. The full frame approaches, i.e., 3-CCD and FSC, have the same achromatic spatial frequency response, bounded by rectangle 48 at 0.5 cy/pix. The CFA has the smaller achromatic range as, indicated by triangle 50.

In FIG. 6, CSF 52 is mapped to digital frequency plane for a high definition (HD) image of 960 lines and a viewing distance of four picture heights, which is appropriate for high definition viewing. Shutter RGB is shown at 54. It may be seen that as the viewing distance increases, or the number of display lines increases, CFA 56 begins to match the maximum frequency capabilities of the HVS. Thus the CFA will generally be more optimum for viewing at greater distances, or at high pixel resolution image display, than the full frame approaches. However, with a more demanding viewing distance, i.e., closer viewing distances or lower resolution capture or display, the full-frame approaches will have a higher perceived resolution.

A new technique to sequentially modulate color has been developed using electronically-controllable LCDs. These LCDs may switch colors through a single optical pathway fast enough to accomplish more than three switches during a video frame, and have no moving parts, which is a significant advantage over prior art systems having moving parts. The problem of color breakup, however, is still not satisfactorily resolved with prior art LCD systems.

In the RGBGRGBG approach, a full resolution G layer, as shown by the outer rectangle in FIG. 4, is present, as are full resolution R and B layers. From spatial psychophysics studies, it is known that this information is wasted. The temporal lag for the R and B layers is four fields, which is too high, because the R and B layers do contain some luminance info. An object of the invention is to sacrifice some of the spatial bandwidth of the R and B layers, in order to increase the temporal bandwidth of R and B. This is accomplished without reducing the spatial or temporal bandwidth of the G, or luminance layer.

This object is accomplished by using a complimentary CFA and a two-state color filter shutter. The spectrum of light is reduced by the addition of color filters in the light pathway. Some of the filter combinations are:
1. G+C filters=passes G light
2. G+Y filters=passes G light
3. M+C filters=passes B light
4. M+Y filters=passes R light Referring now to FIG. 7, a first embodiment of a CFA of the invention is depicted generally at 60. The functionally white light 62, which it may be filtered to compensate for sensor response, entering the image capture portion of the imaging system is first affected by a color shutter, which, in the preferred embodiment, is an LCD color field shutter (CFS) 64 which has two shutter states: green 66 and magenta 68. These states change at a rate referred to as the color field rate (CFR). The light passing through this electronically controlled shutter then impinges the color filters of a color filter array (CFA) 70, located between the first color shutter and the pixel sensors of the imaging chip. These are usually embedded directly on the chip.

The imaging sensor captures the spectrum in two states as a result of passing through the CFS and through the color filters in the CFA, i.e., the previously identified cyan and yellow filters. Based on the previously identified subtraction properties, during G shutter field 66, sensor 70G captures only G. This G capture is at the full resolution of the sensor, giving a frequency response the same as for the standard fields sequential color approach, represented by the outer rectangle in FIG. 4. This captures the G, or luminance layer.

During the magenta color field shutter 68, the sensor captures R and B in a checkerboard pattern 70M. Both the R and the B capture have the same spatial characteristics of the G layer in the Bayer pattern. This provides the frequency response shown as the triangle in FIG. 4. Note that this has higher bandwidth than does the Bayer CFA approach for R and B, which is the small rectangle in FIG. 4. The color lag of R and B is reduced from four frames to two frames, as compared to the RGBG field sequential color approach. This is because only two color shutter states are required to capture R, G, and B.

The exact color filters may be modified to capture images in as close as possible to the YUV video space, where Y is luminance, U is a scaled B-Y color difference and V is a scaled R-Y color difference. The key aspect of this capture is to capture Y directly, to minimize the color offsets due to camera or object motion from having substantial effect on the Y signal.

With this technique, the G signal, serving as an approximate luminance signal, is captured at either half the temporal resolution, or at the same temporal resolution, but with a reduced exposure, one-half that of the standard CFA approach. This suggests a reduction in the SNR of G, however, this reduction is easily made up by increasing the spatial resolution by a factor of two. The frequency domain extends from the triangle, bounded by B-L-N boundary 40, to rectangle 42 of FIG. 4. The temporal characteristics of the R and B signals behave similarly, resulting in an increase in spatial bandwidth for each by a factor of two, as the frequency domain is extended from the small rectangle to the larger triangle in FIG. 4, which compensates for the reduction in the SNR. This technique has the same theoretical SNR as the standard CFA approach.

This technique does suffer, however, because the luminance temporal resolution is a factor of two less than that achieved with the standard CFA approach. With regard to the FSC approach, the only apparent disadvantage is that the spatial bandwidth of the R and B layers is reduced by one-half. However, it does retain the H and V resolution, because it loses bandwidth along the diagonal. Fortunately, due to HVS considerations, this loss of R and B bandwidth is perfectly acceptable if these signals are used to form color difference signals, i.e., R-Y and B-Y. The main advantage over RGB FSC is that the data rate of the sensor may be lower by two-thirds.

Figure 8:
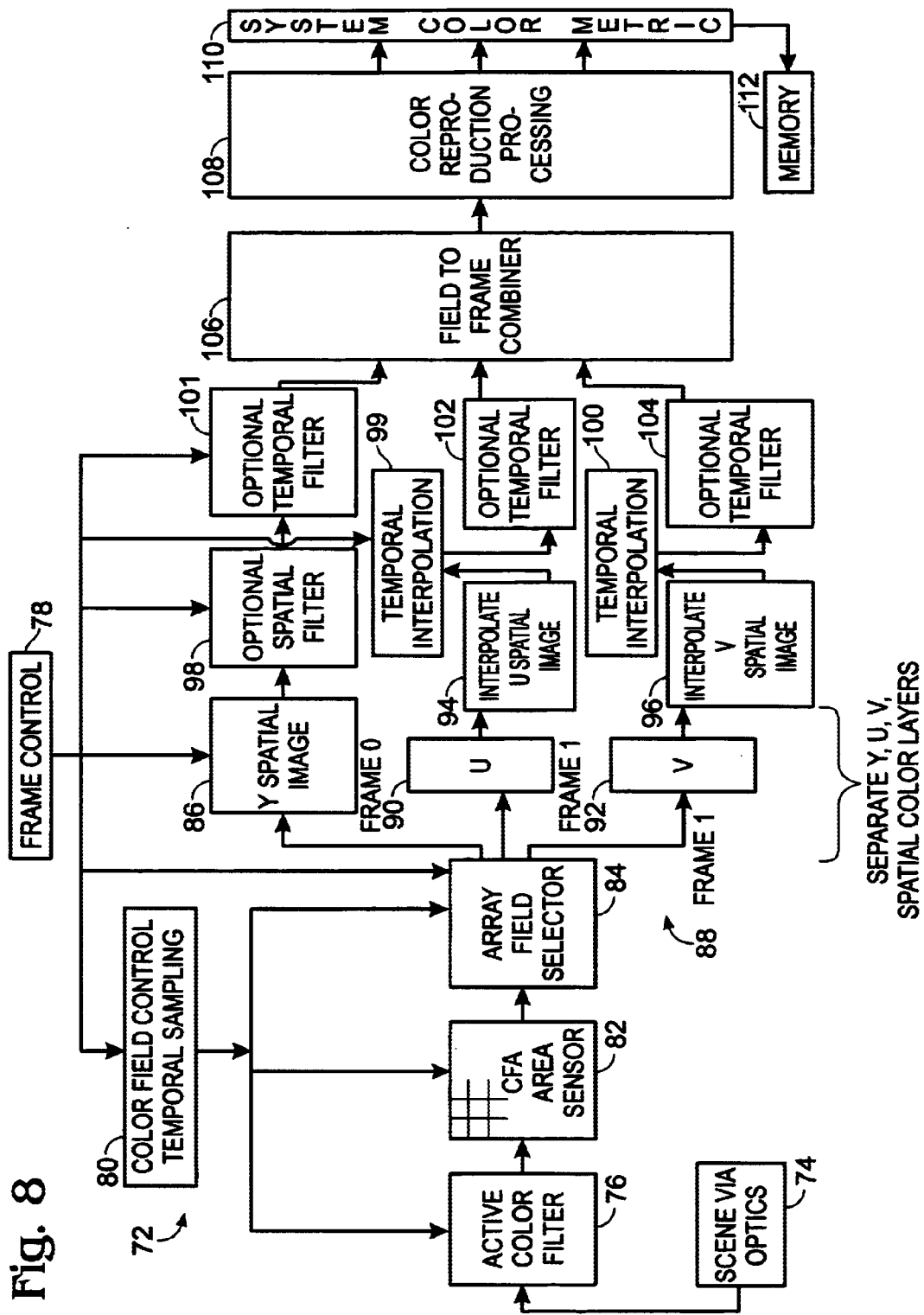
FIG. 8 is a block diagram of a system constructed according to the invention.

The system of the invention is depicted in FIG. 8, generally at 72. A scene 74 is captured frame-by-frame via optics. Each image is passed through a color shutter, or active color filter, 76, which changes its spectral transmission as a function of time, controlled, in turn, by frame control clock 78, which operates at a first predetermined rate, and then by a color field control clock 80, which operates at a second predetermined rate. The first predetermined rate is 60 frames per second (fps) for current progressive formats, but may be set to any desired and achievable rate. The filtered scene impinges CFA area sensor 82, which nominally captures two color fields. These two images are clocked to an array field selector 84 at the field rate, or third predetermined rate, which is typically two times faster than the frame rate. It should be understood that the second predetermined rate may equal the first predetermined rate in terms of a trigger pulse which triggers (1) a new frame, and (2) a new color in the shutter. Alternately, the second predetermined rate may be set to 2× the first predetermined rate. Array field selector 84 is also referred to as a digital image-to-memory mapper.

The two fields captured in different points in time are distributed to Y channel 86, and then the combined U and V channel 88. The U and V samples from each frame are separated into two spatial images 90, 92, respectively. They are then spatially interpolated 94, 96, to fill in their missing pixel positions. Interpolation may be as simple as pixel replication or as complex as edge-gradient oriented interpolation with bicubic spline. A frame consists of a number of fields. A color field and an interlaced field are different entities, but may be combined during portions of the processing.

An optional spatial filtering step 98 for the Y image, may also include edge enhancement or noise removal. Temporal interpolation for the U component, block 99 and for the V component, block 100 next occurs. The interpolation method is selected from one of several standard techniques, depending on the processing power of the system. Interpolation methods may include (1) pixel replication, (2) linear interpolation, (3) cubic-spline interpolation, and infinite impulse response (IIR) filtering. All three Y, U and V images at full resolution may be temporally filtered 101, 102, 104, respectively, based on information in the other three channels.

The U and V are interpolated in time, either via temporal filtering or by non-linear means, and aligned with the Y image, also interpolated in time, in field-to-frame combiner 106. The three separate field images are then combined into a frame image, and processed according to protocols of color reproduction and format by reproduction processor 108, for eventual coding for transmission to recorders and other devices, such as system color metric 110. Information from the full Y spatial image may be used in the interpolation of U and V. Correlations across the Y, U, and V image layers may be used in the temporal interpolation and temporal alignment steps. The image is finally stored in memory 112, as three spatial images per frame.

The timing of the color field captures are indicated in FIG. 9 at 114, where the horizontal axis is time, and the spatial is indicated vertically. Vertical stripe 116 represents Y captured during the green shutter field while vertical UV stripe 118 indicates the checkerboard spatial sampling of the U, V images during the magenta shutter field.

In the most common applications, this scheme requires a color field rate of two times the frame rate, which would in turn require 60 fps data rate for the transfer from imager to memory for a system using a frame rate of 30 fps. This would be applicable to interlace at 60 interlace fields/sec, or a progressive system at 30 fps. For a progressive system at 60 fps, the data unloading from the imager would need to work at the rate of 120 fps.

Returning momentarily to FIG. 8, The third predetermined rate, used with array field selector 84, is required only for an interlaced image, but is not required for a progressive version of forming an image. In the interlaced image, the second predetermined rate may be set equal to the third predetermined rate, or the second predetermined rate may be set equal to 2× the third predetermined rate.

There are three alternative embodiments of the invention. The first is shown in FIG. 10, generally at 120, and involves temporally dithering, i.e., speeding up the color field rate relative to the frame rate, the G and R/B exposures within a frame. This reduces the color breakup artifact, but forces the data rate off the sensor to be faster. The rate of the active color filter also needs to be similarly increased, but currently the limiting technology is in getting the data off the sensor. This technique reduces the color breakup, transforming it more into a familiar luminance blur that is no more than for the equivalent shutter speed for CFA or 3-CCD cameras.

A second alternative is to run the system shown in FIG. 9 such that the color shutter field rate matches the existing frame rate. This would suffer a slight loss in image quality, solely due to the visible jutter effect of the subsampled luminance frames.

Figure 11:
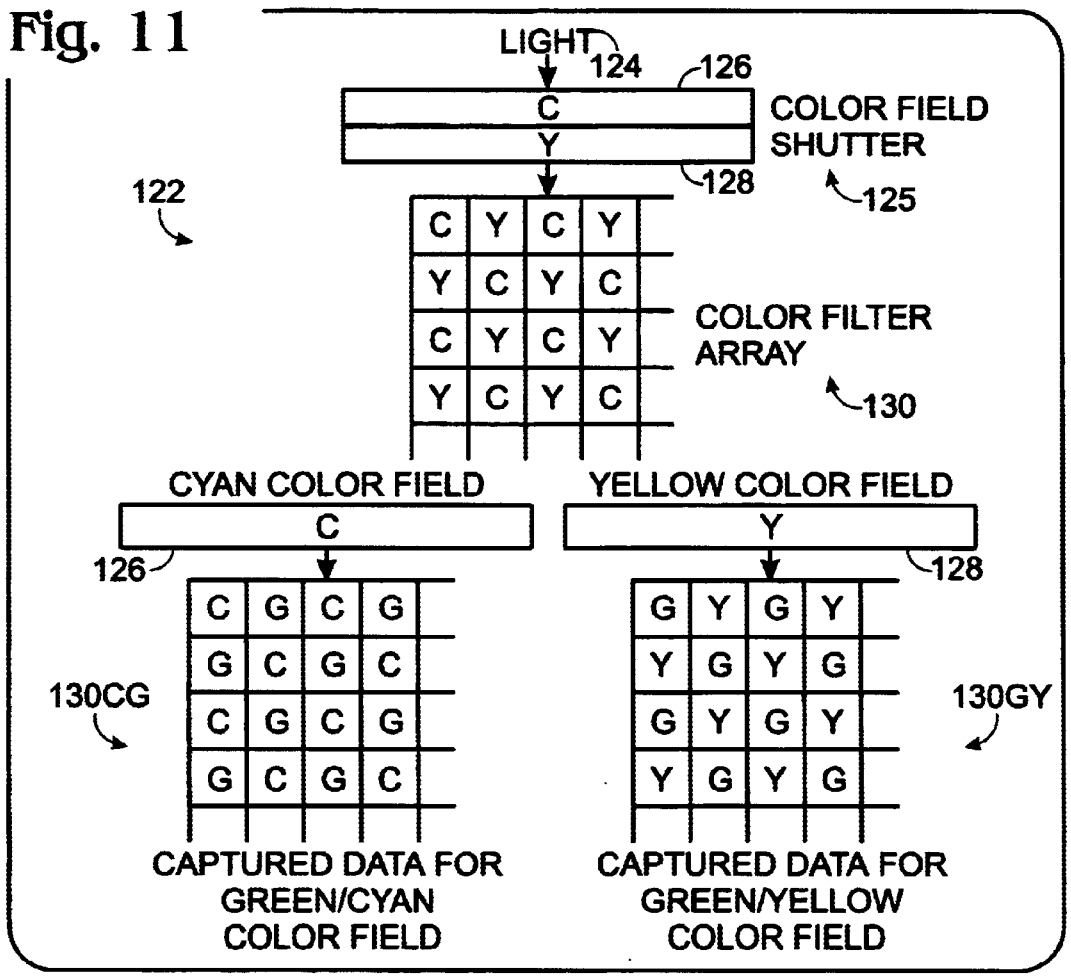
FIG. 11 is a schematic representation of an alternate CFA of the invention.

The third alternative, shown in FIG. 11, generally at 122, removes the visible luminance, via G, jutter for the second alternative, i.e., the case where there are constraints on increasing frame rate. It does this by sacrificing the full resolution green on a single field of the color shutter pair of fields, and splits the green samples across both color shutter fields. White light 124 enters and impinges on a color field shutter 125 having a cyan 126 and yellow 128 color shutter pair, and is transmitted to CFA 130. This provides one field of G and C, 130CG, and one field of G and Y, 130GY. The RGB signal may be retrieved by converting the G to an M by using M=1−G, giving a complimentary capture CMY. This may be converted to RGB via the usual means.

There are different temporal interpolation requirements depending on whether the scheme of FIG. 7 or FIG. 11 is used. The G component requires temporal interpolation, as do the R and B components. The R and B component also require spatial interpolation. The order of the spatial and temporal interpolation may be reversed or executed simultaneously. With the scheme of FIG. 11, G only requires spatial interpolation, and does not require temporal interpolation.

One disadvantage of this approach is that the C/Y color shutter is more expensive than the complimentary G/M. Also, a complimentary system gamut introduces more chromatic noise via the matrix to get back to RGB. It does however, have better noise characteristic in dim light. Regarding spatial bandwidth issues, for any field we have reduced the resolution to the Bayer pattern for G, from the full resolution version of FIG. 7. However, the spatial bandwidths of the R and B signals, via C and Y, is not changed. In exchange for the spatial bandwidth reduction to G, its temporal bandwidth is increased by a factor of two to avoid the jutter artifact. Further, in scenes where there is no motion, the G resolution may be nearly returned to the full resolution of FIG. 7 by using the interleaved samples from both color shutter fields. In scenes where there is motion, the G resolution is not as critical, due to the spatiovelocity CSF of the HVS.

Note that it is also possible to use a CFA with a Y and C striped pattern, as opposed to a checkerboard; so that the G layer is captured in a traditional line interlace manner. Then the Y and C layers will be captured in a line-subsampled manner, which gives acceptable results, at the quality level of the 4:2:2 video standard.

Thus, a method for FSC capture, and several variations thereof, has been disclosed. While preferred embodiments of the method have been described, it will be appreciated that further variations and modification may be made thereto without departing from the scope of the invention as described in the appended claims.

We claim:

1. A method of field sequential color image capture comprising:

optically capturing a scene frame-by-frame;

filtering the scene through an active color shutter to produce a first color component set having plural first color components therein, thereby modifying the spectral transmission of the scene as a function of time, wherein said modifying includes operating a frame control clock at a first predetermined rate, operating a color field clock at a second predetermined rate, and operating an interlaced array field selector at a third predetermined rate, wherein the third predetermined rate is equal to the second predetermined rate, and wherein the second predetermined rate is greater than the first predetermined rate;

detecting the scene with a color filter array area sensor, wherein each first color component of the first color component set of the scene is detected at different points in time within a frame;

dividing the detected scene into a second color component set having plural second color components therein;

aligning the second color component set in time for each frame interval;

storing each second color component in a memory unit;

combining the stored second color components into a frame image; and processing the frame image for color reproduction and format.

2. The method of claim 1 wherein said dividing includes dividing the scene into Y and combined U and V color components.

3. The method of claim 2 which includes, after said storing, temporally filtering at least some of the second color components.

4. The method of claim 3 wherein said filtering includes temporally filtering and spatially interpolating the U and V color components.

5. The method of claim 3 wherein said filtering includes temporally and spatially filtering the Y color component.

6. The method of claim 1 wherein said operating includes setting the second predetermined rate to about 2× that of the first predetermined rate.

7. The method of claim 1 wherein said filtering the scene includes filtering the scene to capture B, Y and R first color components.

8. The method of claim 1 wherein said filtering the scene to produce a first color component set includes filtering the scene to acquire green, red and blue first color components.

9. The method of claim 1 wherein said filtering the scene to produce a first color component set includes filtering the scene to acquire cyan-green and green-yellow first color components and spatially interleaving the cyan-green and green-yellow first color components.

10. The method of claim 1 wherein said dividing includes dividing the scene into a luminance color component at a first frame time and dividing the scene into a UV color component at a second frame time.

11. The method of claim 1 wherein said combining includes spatially interleaving the second color components.

12. A method of field sequential color image capture comprising:

optically capturing a scene frame-by-frame;

filtering the scene through an active color shutter to produce a first color component set having plural first color components therein, thereby modifying the spectral transmission of the scene as a function of time, wherein said modifying includes operating a frame control clock at a first predetermined rate, operating a color field clock at a second predetermined rate, and operating an interlaced array field selector at a third predetermined rate, wherein the third predetermined rate is equal to the second predetermined rate, and wherein the second predetermined rate is greater than the first predetermined rate;

detecting the scene with a color filter array area sensor, wherein each first color component of the first color component set of the scene is detected at different points spatially in the image through two different color filters and is detected at different points in time within a frame; and dividing the detected scene into a second color component set having plural second color components therein.

13. The method of claim 12 wherein said dividing includes dividing the scene into Y and combined U and V color components.

14. The method of claim 13 which includes, after said storing, temporally filtering at least some of the second color components.

15. The method of claim 14 wherein said filtering includes temporally filtering and spatially interpolating the U and V color components.

16. The method of claim 14 wherein said filtering includes temporally and spatially filtering the Y color component.

17. The method of claim 16 wherein said operating includes setting the second predetermined rate to about 2× that of the first predetermined rate.

18. The method of claim 12 wherein said filtering the scene includes filtering the scene to capture B, Y and R first color components.

19. The method of claim 12 wherein said filtering the scene to produce a first color component set includes filtering the scene to acquire green, red and blue first color components.

20. The method of claim 12 wherein said filtering the scene to produce a first color component set includes filtering the scene to acquire cyan-green and green-yellow first color components and spatially interleaving the cyan-green and green-yellow first color components.

21. The method of claim 12 wherein said dividing includes dividing the scene into a luminance color component at a first frame time and dividing the scene into a UV color component at a second frame time.

22. The method of claim 12 wherein said combining includes spatially interleaving the second color components.

23. The method of claim 12 which further includes:

aligning the second color component set in time for each frame interval;

storing each second color component in a memory unit;

combining the stored second color components into a frame image; and processing the frame image for color reproduction and format.

24. A system for capturing a field sequential color image, comprising:

an optical capture mechanism for capturing a scene frame-by-frame in frame intervals which operates at a predetermined shutter speed;

a color shutter for producing a first color component set having plural first color components therein, thereby modifying the spectral transmission of the scene as a function of time;

a CFA area sensor for sensing said first color components, wherein each first color component of the scene is detected at a different point in time within a frame;

an array field selector for dividing the scene into a second color component set having plural second color components therein;

a frame clock operating at a first predetermined rate, a color field control clock, operating at a second predetermined rate under control of said frame clock, for controlling said color shutter and said area sensor at a second predetermined rate, wherein and said array field selector operates at a third predetermined rate;

multiple memory locations for storing each color component; and a field-to-frame combiner for combining the stored second color components into a frame image.

25. The system of claim 24 wherein said array field selector divides the scene into Y and combined U and V color components.

26. The system of claim 25 which includes temporal and spatial filters for temporally and spatially filtering at least some of the second color components.

27. The system of claim 26 which includes temporal filters and spatial interpolators for temporally filtering and spatially interpolating the U and V color components.

28. The system of claim 26 which includes temporal and spatial filters for temporally and spatially filtering the Y color component.

29. The system of claim 24 wherein said active color filter includes an LCD color field shutter having plural shutter states.

30. The system of claim 29 wherein said LCD color field shutter changes state at said third predetermined rate.

31. The system of claim 24 wherein said third predetermined rate equal to said second predetermined rate, and wherein said second predetermined rate is 2× that of said first predetermined rate.

32. The method of claim 24, wherein said first color components are G, R and B.

33. The system of claim 24 which further includes a color reproduction processor for processing the frame image for color reproduction and format.

* * * * *